United States Patent [19]
Stiefvater

[11] 3,906,312
[45] Sept. 16, 1975

[54] METALLIZED CAPACITOR WITH IMPROVED INSULATION BETWEEN LEADS

[75] Inventor: Clarence Kurt Stiefvater, Fairfax, Va.

[73] Assignee: Illinois Tool Works Inc., Chicago, Ill.

[22] Filed: July 3, 1974

[21] Appl. No.: 485,407

[52] U.S. Cl. ................................................ 317/260
[51] Int. Cl.² ........................................... H01G 1/14
[58] Field of Search ........................... 317/260, 242

[56] References Cited
UNITED STATES PATENTS
1,952,925   3/1934   Kopinski ............................. 317/260
3,758,833   9/1973   Rayburn ............................. 317/260

Primary Examiner—E. A. Goldberg
Attorney, Agent, or Firm—Robert W. Beart; Glenn W. Bowen

[57] ABSTRACT

A wound capacitor using a double-sided metallized dielectric film layer and a pair of conductive foils each of which contact one of the leads of the capacitor and one side of the metallized strip is disclosed. The capacitor has improved insulation resistance between the leads due to a dielectric film strip which is placed between one of the foils and one surface of the double metallized layer. The capacitor is then formed by winding these elements about the leads so that the dielectric film strip provides both increased insulation between the leads and an outer layer around the capacitor. An additional insert of insulating material may be placed between the foil and the dielectric film strip. One end of each side of the double-sided metallized film is provided with only an unmetallized margin and the ends of the capacitor are sprayed with a conductive film when the capacitor is formed to reduce the resistance of the unit.

2 Claims, 5 Drawing Figures

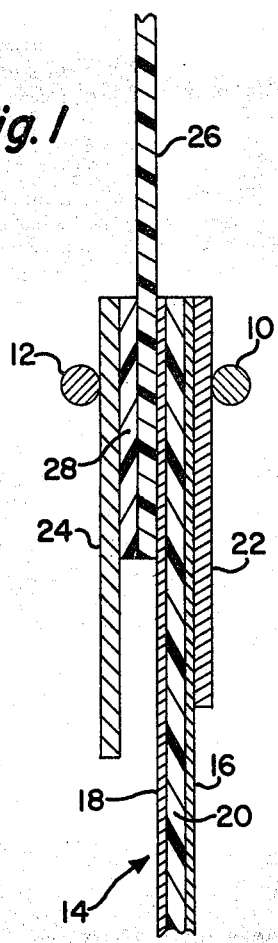
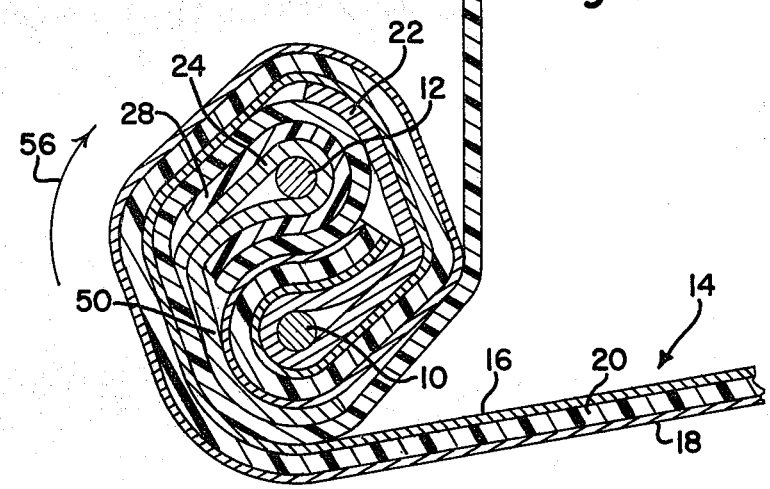
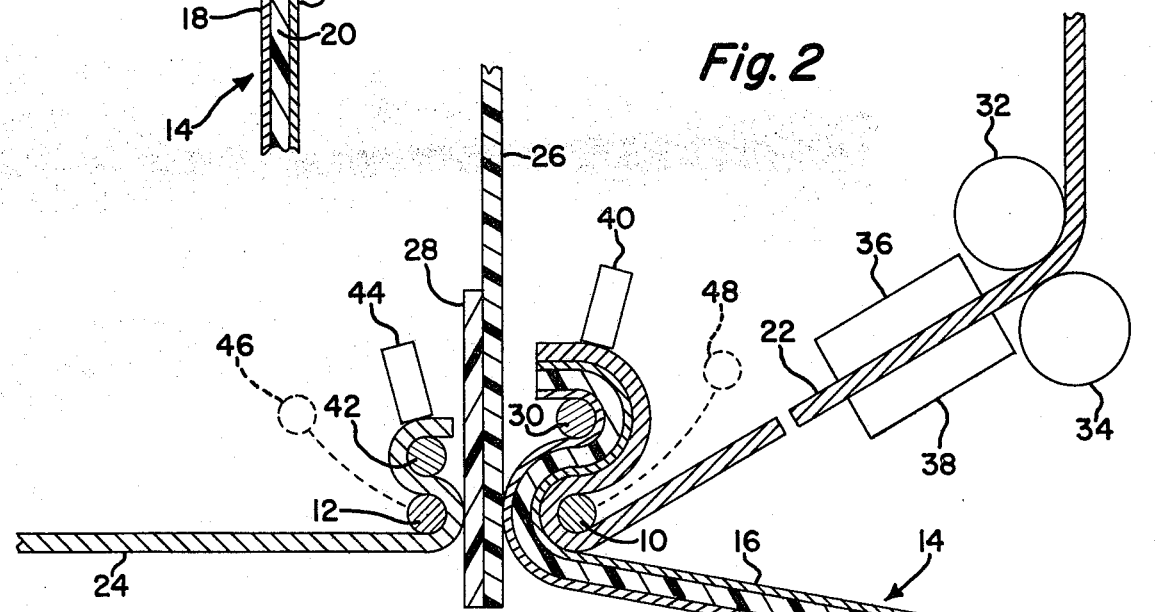
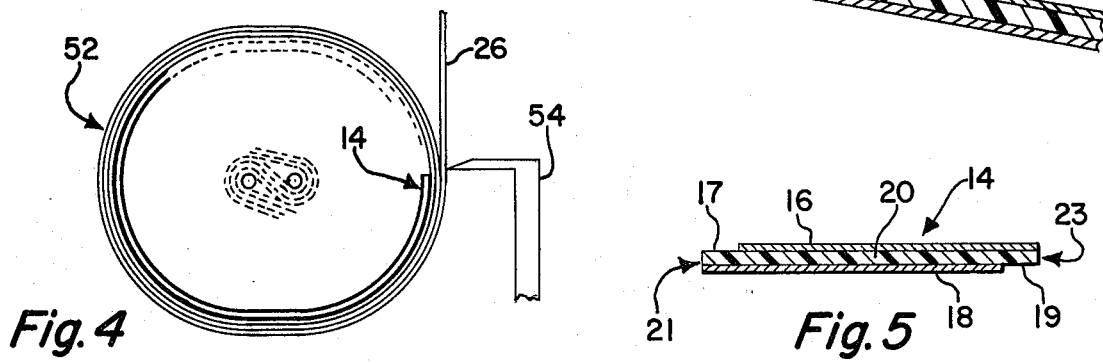

METALLIZED CAPACITOR WITH IMPROVED INSULATION BETWEEN LEADS

BACKGROUND OF THE INVENTION

Double-sided metallized plastic dielectric films are highly desirable for wound electrical capacitors since they provide a self-healing characteristic when an electrical breakthrough or arcing occurs in the dielectric. The breakthrough or arcing can be removed by applying a current surge to the metallized film to burn out the thin deposited layer of metal in the area of the breakthrough.

Also, in the winding of an electrical capacitor, it is desirable to use the lead wires as winding mandrels since they will remain in place after the winding is completed; and thus, the possibility of having the capacitor unwind is greatly reduced since the lead wires are not retracted after winding. Therefore, a capacitor wound about the leads and using double-sided metallized film would be a highly advantageous capacitor. It has been found that this type of capacitor can be improved upon even more by providing a thin foil of a conductive material between the leads and the outer surfaces of the double-sided metallized film. This metallized foil will provide improved electrical contact between the leads and the electrode areas of the capacitor, and it will also reduce the possibility of failure due to tearing of the metallized film layer in the area of the leads. An example of such a construction is shown in co-pending U.S. patent application Ser. No. 489,347, now abandoned, filed in the name of John Phillip Uhl and Ki Hong Kim, which application was assigned to the assignee of the present invention and has issued as U.S. Pat. No. 3,879,174. U.S. Pat. No. 3,879,174 is a continuation-in-part of Patent Application Ser. No. 440,495, now abandoned.

In the capacitor of the Uhl et al. patent, a plastic outer insulating layer is wound about the formed capacitor by using a retractable mandrel. When the winding is completed, the outer insulating layer is heat sealed to itself so as to form an outer protective coating over the capacitor. While the capacitor of the Uhl et al. patent is a highly desirable and improved capacitor, it has been found that this capacitor did not provide sufficient electrical insulation between the leads for high voltage applications. The capacitor of the present invention retains the advantages of the use of double-sided film and foil strips between the leads and the film, while also providing for significantly improved electrical insulation between the leads. In addition, the dielectric strip which is used to provide insulation between the leads is the same strip that provides the outer insulating layer for the capacitor. In this manner the construction of the capacitor is not only improved, but the winding of the capacitor is made simpler because the retractable mandrel that is employed to wind the capacitor of the Uhl et al patent is no longer required.

It is, therefore, the object of the present invention to provide for an improved wound capacitor using a double-sided metallized film, a pair of leads, a conductive foil between at least one of the leads and one side of the double-sided metallized film and a dielectric insulating layer which is inserted between said foil and said side of the double-sided metallized film in order to improve the insulation resistance between the leads and to provide the capacitor with an outer insulating layer.

DESCRIPTION OF THE DRAWINGS

FIG. 1 shows a cross-sectional view of the layers of material that are used to form the capacitor prior to their being wound about the leads of the capacitor;

FIG. 2 is a diagrammatic representation illustrating the manner in which the layers that form the capacitor are placed between and are wound about the lead wires;

FIG. 3 is a partially completed capacitor which shows how the layers are related as the capacitor is wound;

FIG. 4 is a completed capacitor in which the outer covering layer is heat sealed to itself; and FIG. 5 is a cross-sectional view of the double-sided metallized film of the present invention.

TECHNICAL DESCRIPTION OF THE INVENTION

Referring to FIG. 1 there is shown a pair of electrically conductive leads 10,12 and five separate layers of material 14,22,24,26,28 which are used to form the capacitor of the present invention by winding the leads about one another. The main electrode portions of the capacitor are formed by a double-sided metallized film 14 which consists of metallized sides 16,18 which are deposited in thin layers on opposite sides of a suitable plastic dielectric layer 20. The metallized layers 16, 18 may be formed of aluminum, copper, zinc, silver, or other suitable electrically conductive layer which may be deposited in a thin film form on a dielectric material. The dielectric layer 20 may be polycarbonate, polyester, polystyrene or any other suitable insulating material. A first conductive foil 22 is inserted between the lead 10 and the surface 16 of the metallized strip 14, and a second conductive foil 24 is inserted so as to contact the lead 12. The foils 22,24 may be aluminum foil, tin foil, or any other suitable electrically conductive foil. A plastic dielectric film strip 26 of polycarbonate, polystyrene, polyester or other suitable dielectric film material is inserted into the capacitor intermediate the conductive foil 24 and the metallized surface 18 of the metallized film 14. The dielectric film strip 26 extends beyond the lead 12 a short distance in one direction and extends out of the layered structure in a direction opposite of that of the layers 20,22,24. If desired, a second short strip of dielectric material 28 may be inserted between the plastic film 26 and the foil 24 so as to further increase the insulation resistance between the leads 10,12 in the vicinity of the lead area, as shown in FIG. 2. In order to provide substantially the same length of contact area between the foil 24 and the metallized surface 18 and between the foil 22 and the metallized surface 16, the foil 24 is slightly longer than the foil 22.

FIG. 2 is a diagrammatic representation of a machine which operates to wind the capacitor of the present invention. The double-sided metallized film strip 14 is wrapped around the lead wire 10 and over the guide roller 30. The conductive foil 22 passes between the feed roller 32 and the pinch roller 34 and through the guide members 36,38 into contact with the surface 16 of the metallized film 14, and then it travels over the top of the guide roller 30. A clamp means 40 holds the outer ends of the metallized strip 14 and the foil 22 in place. The conductive foil 24 passes over the lead 12 and around the support roller 42, and the outer end of the foil 24 is held in place by means of the clamp 44. The lead wires 10,12 are moved from their initial position 46,48, represented by the dotted circles in FIG. 2, to the position they are shown at in FIG. 2 when the winding is to begin.

The layers of the capacitor are wound about one another, as indicated by the arrow 56 in FIG. 1, so that the respective layers of the capacitor are related as shown in FIG. 3. As seen in FIG. 3, the insulating layer 26 and the insulating layer 28 isolate the lead 12 from the surface 18 of the double-sided metallized film layer 14 in the area of the leads. Contact between the foil 24 and the surface 18 of the metallized film layer 14 is first made away from the lead area at approximately the location 50. The foil 22, on the other hand, makes contact with the surface layer 16 of the double-sided metallized film layer 14 along substantially the entire length of the foil 22. Thus, it is seen that between the leads 10,12 there are three layers of dielectric material. These are the layer 20 of the double-sided metallized strip 14, the layer 26 and the insert layer 28. In this way increased insulation resistance is provided between the leads 10,12 and the high voltage utility of the capacitor is improved.

As winding of the capacitor of FIG. 3 continues, the desired capacitance value is eventually reached, and the double-sided metallized film 14 is cut. However, the dielectric film strip 26 continues to be supplied and wound around the outer surface of the capacitor, as shown in FIG. 4, in order to provide an outer insulating cover for the capacitor. The completed capacitor 52 of FIG. 4 is achieved when a heat sealing means 54 is utilized to melt the end of the dielectric strip 26 to an underlying winding of the same strip 26 so as to provide surface-to-surface sealing between overlapping layers of the plastic film 26.

The ends of the capacitor are sprayed with a conductive film to reduce the resistance of the unit. The metallized film 14 is constructed to have unmetallized margin areas 17,19, as shown in FIG. 5. Thus, when the capacitor is wound and sprayed on its ends, the layers 18 will be interconnected by the sprayed conductive film at the left-hand end 21 of the film 14; but due to the margin 17, the layers 16 will not be connected to the layers 18. Similarly, the layers 16 will be interconnected by the sprayed conductive film at the right-hand end 23 of the film 14 where again the margin 19 prevents shorting to the layers 18. The layers 16,18 could alternately be formed as extended layers which extend outwardly beyond the ends 21,23 of the dielectric layers 20, if desired.

The invention is claimed as follows:

1. A wound electrical capacitor comprising a double-sided metallized dielectric film layer having first and second metallized sides, first and second lead wires which are used as winding mandrels, first and second conductive foils in contact with said first and second leads respectively, a dielectric film layer which has an end portion positioned intermediate said first conductive foil and said first side of said double-sided metallized film, said first side of said double-sided metallized film being in contact with a portion of said first conductive foil which extends beyond said end portion of said dielectric film layer, said second side of said double-sided metallized film being in contact with said second conductive foil and said dielectric film being wound around said leads for a length longer than the length of said double-sided metallized film layer so as to provide an outer insulating cover layer for said capacitor in addition to providing increased insulation between said first and second leads, and a conductive film applied to the ends of said wound capacitor to interconnect the edges of said first conductive foil at one end of said wound capacitor and the edges of said second conductive foil at the other end of said wound capacitor.

2. A capacitor as claimed in claim 1 wherein an additional dielectric film insert is positioned intermediate said dielectric film strip and said first conductive foil so as to provide increased insulation resistance between said leads.

* * * * *